United States Patent
Couzin et al.

(10) Patent No.: US 6,871,966 B2
(45) Date of Patent: Mar. 29, 2005

(54) RETROREFLECTOR WITH CONTROLLED DIVERGENCE MADE BY THE METHOD OF LOCALIZED SUBSTRATE STRESS

(75) Inventors: Dennis I. Couzin, Evanston, IL (US); Steven R. Chapman, Niles, IL (US); Kejian Huang, Buffalo Grove, IL (US)

(73) Assignee: Avery Dennison Corporation, Pasadena, CA (US)

( * ) Notice: Subject to any disclaimer, the term of this patent is extended or adjusted under 35 U.S.C. 154(b) by 55 days.

(21) Appl. No.: 10/317,812

(22) Filed: Dec. 12, 2002

(65) Prior Publication Data

US 2004/0114243 A1 Jun. 17, 2004

(51) Int. Cl.[7] .............................................. G02B 5/124
(52) U.S. Cl. ........................ 359/530; 359/900; 264/1.9
(58) Field of Search ................................ 359/529–530, 359/900; 428/156, 172, 221, 223, 338, 913; 264/1.1, 1.9, 219–220, 225–226

(56) References Cited

U.S. PATENT DOCUMENTS

| | | |
|---|---|---|
| 3,684,348 A | 8/1972 | Rowland |
| 3,712,706 A | 1/1973 | Stamm |
| 3,833,285 A * | 9/1974 | Heenan ...................... 359/551 |
| 4,478,769 A | 10/1984 | Pricone et al. |
| 4,775,219 A | 10/1988 | Appeldorn et al. |
| 4,938,563 A | 7/1990 | Nelson et al. |
| 6,015,214 A | 1/2000 | Heenan et al. |
| 6,231,797 B1 * | 5/2001 | Bernard et al. ............. 264/220 |

OTHER PUBLICATIONS

"Study of Light Deviation Errors in Triple Mirrors and Tetrahedral Prisms," J. Optical Soc. Amer., vol. 48, No. 7, pp. 496–499, Jul., 1958 by P.R. Yoder, Jr.

U.S. Appl. No. 10/167,135, Couzin et al., filed Jun. 11, 2002.

* cited by examiner

*Primary Examiner*—James Phan
(74) *Attorney, Agent, or Firm*—Renner, Otto, Boisselle & Sklar, LLP

(57) ABSTRACT

A cube corner array with minute modifications of the dihedral angles of some of the cube corners is produced by introducing a stress or change via the opposite side of the substrate. The array having aberrated elements can be replicated for use in the manufacture of a tool, and the tool can be used in the manufacture of retroreflective products of broader divergence.

27 Claims, 9 Drawing Sheets

RETROREFLECTOR WITH CONTROLLED DIVERGENCE MADE BY THE METHOD OF LOCALIZED SUBSTRATE STRESS

BACKGROUND OF THE INVENTION

This invention relates to a method of making a retroreflective article having controlled divergence, and articles made by the method.

It is well known that retroreflective articles can be made from an array of microcube corner elements. Such an array of microcube corner elements can be made by ruling a master of "male" cube corners into a planar surface of a plate. This is taught generally by Stamm U.S. Pat. No. 3,712,706. It also is taught in detail in Pricone U.S. Pat. No. 4,478,769, assigned to the common assignee and incorporated herein by reference in its entirety.

U.S. Pat. No. 4,478,769 describes a well-known method of making triangular cube corner elements, in which the planar surface of a master plate is ruled with a diamond cutting tool that cuts a series of precise parallel vee-grooves. To rule equilateral triangular cube corners, three sets of parallel grooves in directions intersecting one another at angles of 60° are made; each groove also will have an included angle of substantially 70.53° disposed symmetrically, and will be ruled to a groove depth determined by the height of the cube corners desired. This method automatically results in an array of pairs of oppositely oriented equilateral triangular microcubes on the face of the master. To rule non-equilateral triangle cube corners the grooves within the parallel sets will contain angles other than 70.53°, and intersect at angles other than 60°, as disclosed, for example in Rowland U.S. Pat. No. 3,684,348. Methods for ruling non-triangle cube corners generally do not use three sets of parallel symmetrically disposed vee-grooves, but the faces of the cube corners are nevertheless formed from the walls of grooves, as disclosed, for example in Nelson U.S. Pat. No. 4,938,563. Methods for creating cube corner arrays other than by ruling a single plate have been disclosed in U.S. Pat. No. 6,015,214. The present invention applies to all microcube corner arrays, regardless of how they originated.

A master of "male" or "female" cube corner elements can be used to make a sequence of copies, of alternating gender, such as by electroforming. At any stage, copies can be assembled together, and the assemblies used to make further copies. After a series of assembly and copying stages, a single "mother" can be formed. The "mother" can be used to make production tools, such as by electroforming, which tools can be used to form microcube retroreflective elements on an expanse of plastic sheeting material such as by embossing, casting, compression molding or other methods known in the art.

Microcube corner retroreflective sheeting such as made by the method described above is used in highway safety applications such as highway signs and pavement markers. In such applications, the microcube corner elements reflect light from a vehicle's headlights back to the eyes of the driver of the vehicle. This is an inexact retroreflection in which the divergence angle, $\alpha$, ranges between approximately 0° and more than 3°. The value of $\alpha$ operative in any given situation depends on the geometry of the vehicle and the driver and the distance from the vehicle to the retroreflective material. For example, the divergence angle $\alpha$ for a large truck's right headlight and its driver at a distance of about 40 meters from a road sign will be approximately 3°, while the divergence angle $\alpha$ for an automobile's left headlight and its driver at a distance of about 600 meters from a road sign will be approximately 0.05°.

Also associated with the divergence angle, $\alpha$, is a rotation angle, $\epsilon$, which is a measure of the direction of the divergence. The value of $\epsilon$ will be different for left and right headlights of a vehicle, and will also depend on the vehicle and driver geometry and the position of the road sign. For sheeting that will be mounted in random orientation on road signs, retroreflectance is required at every value of $\epsilon$. The angles $\alpha$ and $\epsilon$ are defined in ASTM E808, Standard Practice for Describing Retroreflection, which document refers to divergence angle $\alpha$ as "observation angle".

Ideally, microcube corner retroreflective sheeting used in road signs will produce a pattern of retroreflected light having sufficient intensity over a range of divergence angle values and rotation angle values. For example, even a non-urban retroreflective highway sign should retroreflect light through a divergence angle $\alpha$ of about 1°, which corresponds to the value of $\alpha$ from a large truck's right headlight back to its driver at a distance of about 120 meters from the road sign.

Improvements in the precision with which microcube corner elements can be ruled in a master plate and duplicated, particularly by embossing, have led to concerns that such microcube corner retroreflective sheeting may be adequately retroreflective over only a very narrow range of divergence angle, such as about 0.0–0.5 degrees. It would be preferred to provide an array of cube corners producing the entire desired range of divergence and within very short distances on the array so that a human observer of the article will see it as retroreflectively uniform.

Light that is retroreflected by micro-sized cube corner elements will experience a certain amount of diffraction because of the very small size of the microcubes. Such diffraction will result in retroreflection over broader ranges of both divergence angle and rotation angle. The particular ranges of $\alpha$ and $\epsilon$ will depend on the particular diffraction pattern of a given microcube, which will depend in turn upon the cube size, cube shape, the index of refraction of the cube material, and upon whether or not the cube faces have been metallized. Diffraction, however, is not a desirable method to enhance retroreflection through broader divergence and rotation angle, because the very small microcubes that achieve greater diffraction also cause a substantial quantity of light to be retroreflected with a divergence angle $\alpha$ of greater than about 3°, where the light is not useful to the vehicle driver. Diffraction also can result in idiosyncratic diffraction patterns that are unlikely to distribute the retroreflected light in a manner that will be useful to a vehicle's driver.

It is known in the art to produce divergent rectroreflectance by means of cube corner elements having intentional aberrations in respect of their dihedral angles deviating slightly from 90°. The classic paper "Study of Light Deviation Errors in Triple Mirrors and Tetrahedral Prisms," *J. Optical Soc. Amer.*, vol. 48, no. 7, pp. 496–499, July, 1958 by P. R. Yoder, Jr., describes the well-known spot patterns resulting from such aberrations.

U.S. Pat. No. 3,833,285 to Heenan, assigned to the common assignee and incorporated herein by reference in its entirety, teaches that having one dihedral angle of a macro-sized cube corner element greater than the other two results in extended observation angularity in microcubes, and specifically that the retroreflected light diverges in an elongated pattern.

When ruling an array of cube corners, dihedral angle errors may be produced either by causing the groove side angles to be slightly different from the design angles, as taught by Stamm U.S. Pat. No. 3,712,706, or by causing the angles of groove root crossings to be different from the design angles, or by combination of these methods.

U.S. Pat. No. 4,775,219 to Appeldorn discloses retroreflective articles having tailored divergence profiles, wherein the cube corner elements are formed by three intersecting sets of parallel vee-grooves, and wherein at least one of the sets includes, in a repeating pattern, at least two groove side angles that differ from one another. Nelson U.S Pat. No. 4,938,563 extended the method of U.S. Pat. No. 4,775,219 to non-repeating patterns of groove side angle differences.

U.S. Pat. No. 6,015,214 to Heenan et al., assigned to the common assignee, teaches methods of forming microcubes by ruling vee-grooves into the edges of a plurality of flat plates, and discloses that the tilt angle of a cutting tool with respect to the plate edges being ruled can be adjusted continuously as each groove is cut as a function of the distance traveled by the cutting tool across the plate edges.

Pending U.S. patent application Ser. No. 10/167,135, filed Jun. 11, 2002, claiming the benefit of Ser. No. 60/297,394, filed Jun. 11, 2001, subsequently published as U.S. Patent Application Publication No. US 2003/0075815 A1, discloses retroreflective articles and a method of making retroreflective articles having controlled broader divergence produced by ruling three intersecting sets of parallel V-shaped grooves in which ruling non-uniform deviations of the cube dihedral angles from exactly 90° are intentionally introduced by causing the cutting tool and the surface of the substrate to oscillate with respect to one another in a controlled manner during the ruling of at least one of the vee-grooves.

It is thus one object of the invention to provide an article comprising an array of retroreflective microcube corner elements having controlled broader divergence.

It is another object of the invention to provide a method for making such an article.

SUMMARY OF THE INVENTION

In accordance with the method of the invention, a substrate is provided having opposed first and second surfaces, said first surface having an array of cube corner elements. The substrate is worked in a controlled manner at one or more localized regions on the second surface to create a localized change in the stress of the substrate material. The degree of working and the arrangement of locations can be substantially regular or they can have controlled irregularity. The substrate is sufficiently thin that the change in stress induced by the working on the second surface causes a change in one or more dihedral angles of one or more of the cube corner elements on the first surface opposite the region of the working. The changes in the dihedral angles of the affected cube corner elements will be on the order of a fraction of a degree. This change is sufficient to create an aberration in the cube corner element that will affect the divergence of light retroreflected by the cube corner. The array with one or more aberrated cube corner elements can be copied, assembled, and recopied, as often as desired and used to form a tool suitable for use in the manufacture of microprismatic sheeting, such as by casting, embossing, compression molding, or other methods. The cube corner sheeting made from such a tool will have a broader range of divergence than cube corner sheeting made from arrays having either no aberrated cube corner elements, or cube corner elements aberrated substantially identically by fixed angle deviations. In a preferred embodiment, the total retroreflectance of the array is substantially preserved.

DESCRIPTION OF THE FIGURES

The foregoing and other novel features and advantages of the invention will be better understood upon a reading of the following detailed description taken in conjunction with the accompanying drawings wherein.

DESCRIPTION OF THE PREFERRED EMBODIMENT

Figure 1A:
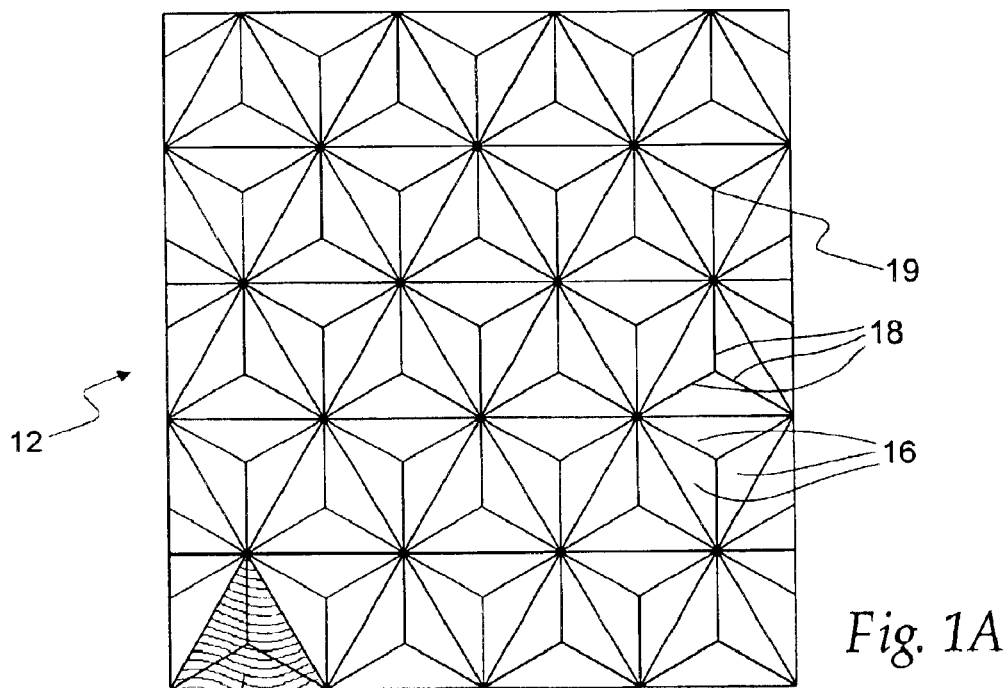
FIG. 1A is a top plan view of a substrate having a standard pattern of retroreflective triangular cube corner elements formed thereon, such as is known in the art.

The term "cube corner elements" as used herein includes those elements consisting of three mutually intersecting faces, the dihedral angles of which are generally on the order of 90°, but not necessarily exactly 90°.

The term "substrate" as used herein means a thickness of a material having an array of either male or female cube corner elements formed on a first surface thereof. The second surface can be flat, or can be somewhat uneven in a pattern generally corresponding to the array of cube corner elements on the front surface. For male cube corner elements, the expression "substrate thickness" means the thickness of material on which the cube corner elements rest.

For female cube corner elements, the expression "substrate thickness" means the total thickness of material into which the female cube corner elements form cavities.

The terms "divergence" and "divergence angle" as used herein mean the angle between the direction of the light that enters a retroreflecting element (e.g., a cube corner) and the direction of the light that leaves that element. In the context of photometry of retroreflectors, this angle is commonly called "observation angle". A non-retroreflecting male cube corner is described by convention as having the divergence of the associated female cube corner that is the geometric complement of the male and constructed of the same material.

Light retroreflects into a two-dimensional intensity pattern, and divergence angle measures the distance from the center of this pattern. The expression "range of divergence" as used herein means the range of divergence angles for which the retroreflectance pattern is relatively intense so as to be useful for the intended purpose of the retroreflective article.

The expression "n'th order copy" of some entity as used herein refers to the resultant of a chain of copies from the first entity, said chain containing exactly n−1 intermediate copies. A direct copy is termed a 1'st order copy. Copying refers to the copying of the cube corner arrayed surface geometry of the entities, and it is understood that most copying methods produce female arrays from male arrays, and male arrays from female arrays. It is further understood that only some portion of the last entity needs to be an n'th order copy of only some portion of the first entity for the term to apply. If there have been assembly steps in the chain of copying, many portions of the last entity can be n'th order copies of the same first entity. If one portion of the last entity is an n'th order copy, while another portion of the last entity is an n'th order copy, of the same first entity, then the last entity is both an n'th order copy and an n'th order copy of the first entity. Copying can be achieved by electroforming, casting, molding, embossing, and other methods that reproduce the surface geometry at a desired precision.

The term "aberration" as used herein means a small change in one or more of the dihedral angles of a cube corner element, sufficient to cause a change in the divergence of the light retroreflected by the element.

The term "total retroreflectance" as used herein means the amount of retroreflected light flux within divergence angle 4 degrees, relative to the incident light flux. The incidence angle is near normal. The incident light is approximately CIE Illuminant A and the sensing is approximately CIE V($\lambda$). When determining whether total retroreflectance is preserved by a process which modifies a retroreflector, compensation is made for any discoloration of the retroreflector. When determining whether total retroreflectance is preserved by a process which modifies a male stage, determination is based on the retroreflectance of female copies made from that male.

The term "mean geometrical divergence" as used herein means the average divergence angle for all rays retroreflected by a cube corner such as would be found by ray-tracing a large number of rays.

FIG. 1A shows a top plan view of a substrate 12 having a first surface 13 and a second surface (not shown) opposite said first surface 13, said first surface 13 having formed thereon an array of triangular cube corner type retroreflector elements 14. The cube corners are males or females, depending on how the figure is apprehended.

Figure 1B:
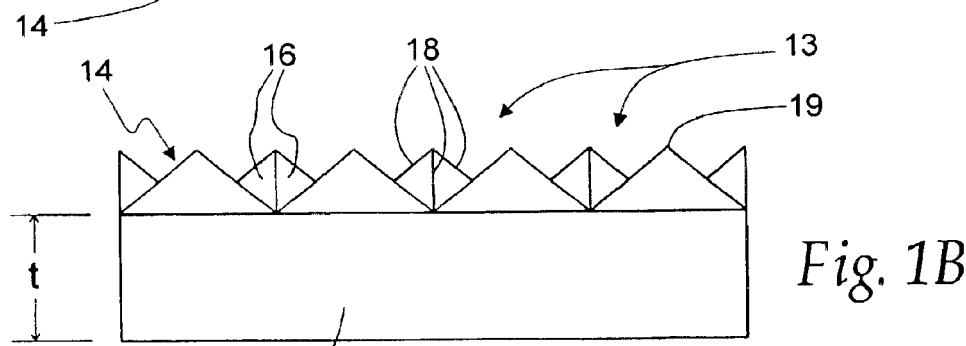
FIG. 1B is a front view of the substrate of FIG. 1A when the cube corner elements are males.
Figure 1C:
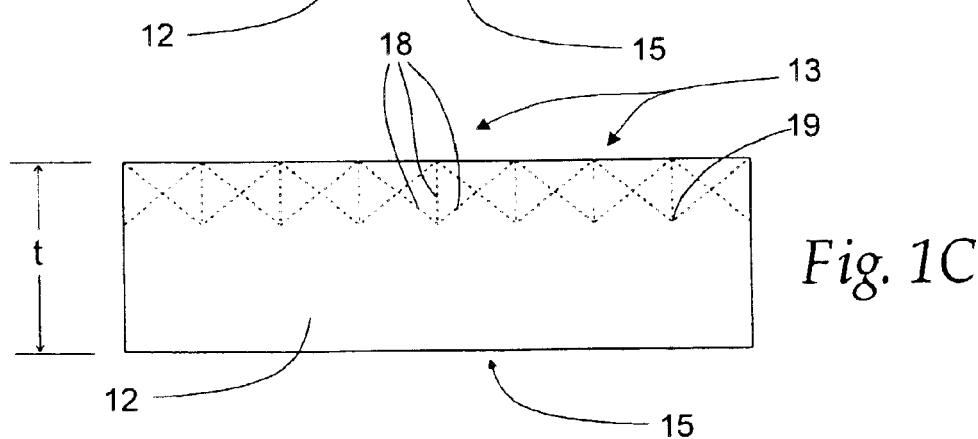
FIG. 1C is a front view of the substrate of FIG. 1A when the cube corner elements are females.

FIG. 1B shows a front view the substrate illustrated in FIG. 1A when the cubes are males. FIG. 1C shows a front view of the substrate illustrated in FIG. 1A when the cubes are females. In FIG. 1C all the cube corner details are in hidden lines. A convention followed herein makes the substrate thickness equal to indicated dimension "t" in FIGS. 1B and 1C.

Cube corner element 14 is formed by three mutually perpendicular faces 16 that meet at apex 19. The mutually perpendicular faces 16 intersect one another at dihedral edges 18. The angles at the dihedral edges 18, between the mutually intersecting faces 16, are called dihedral angles. In a geometrically perfect cube corner element, each of the three dihedral angles is exactly 90°.

Generally, for use in the method of the instant invention, the preferred thickness of substrate 12 will depend on the material of which the substrate is made. For electroformed nickel, the thickness of the substrate 12 will generally be in the range of about 0.1 mm to about 2.0 mm, more preferably in the range of about 0.2 mm to about 1 mm, and in a preferred embodiment in a range of about 0.3 mm to about 0.6 mm. Suitable materials from which substrate 12 can be made include metals and plastics. Substrate 12 can be a ruled master, if that master is not too thick. Preferably, substrate 12 is an n'th order copy of a master in which cube corner elements are formed such as by ruling, or by any of the methods disclosed in the aforementioned U.S. Pat. No. 6,015,214 or Ser. No. 10/167,135.

Substrate 12 is then worked in a controlled manner at one or more localized regions of its second surface, the working being sufficient to create a localized change in stress in the substrate material, which stress change causes a change in one or more of the dihedral angles of one or more of the cube corner elements on the first surface opposite the site of the working. The working of the second surface is intended to either add, remove, or modify material in the localized regions on the second surface, or to simply apply local pressure, temperature, or other disturbance. The working is of a degree sufficient to cause a change in the stress of the material comprising the cube corners 14 opposite the localized region of the working, resulting in a minute change of one or more dihedral angles 18, thus aberrating the cube corner element. This minute change of the dihedral angles will be generally on the order of a fraction of a degree. For slightly curved cube faces, the dihedral angles are defined between the planes that best fit the faces. The degree of face curvature produced by this method can be optically insignificant.

In a preferred embodiment of the invention, the working on the second surface will be of a magnitude sufficiently small that it will not damage the smoothness of the cube faces and the sharpness of the cube edges on the first surface. Further, no work need be done on the first surface that would adversely affect either the surface smoothness or the sharpness of the edges of the cube corner elements. Therefore, in a preferred embodiment of the invention, the total retroreflectance of each cube corner element is substantially preserved.

The controlled working of the second surface that introduces the change in stress can be accomplished by a variety of means, including the application of energy, chemicals, machining or pressure to the second surface.

Energy can be applied, for example, as either electrical energy or focused heat, such as by an infra-red laser or a pencil tip torch. For example, focused laser energy can melt a very small amount of material in a localized area on the second surface. The melted material then can either evaporate, blow away, or resolidify, such that any of these changes in the substrate material will either increase or decrease the stress of the material in the localized regions. Laser pulses can be applied at about 150–700 points per $cm^2$ of surface, with each pulse affecting the dihedral angles of about 1–10 cube corner elements on the first surface; other values of the number of laser pulses per unit area can be used depending upon the desired optical effect.

Chemicals can be particularly useful where the substrate 12 is a plastic material. In such cases, the application of a drop of solvent on the second surface of the substrate causes the substrate to pucker slightly, thereby affecting the dihedral angles of at least some of the cube corner elements on the first surface.

Machining methods can include, for example, microdrilling. Drilling involves the removal of material, with minimal direct disturbance of the surrounding material. Drilling is preferably used in the method of the instant invention in which the substrate being worked already has some internal stress; drilling provides localized relief of stress, and the resulting stress differential creates the minute distortion of the dihedral angles in the cube corner elements on the first surface opposite the drilling.

Pressure can produce localized distension involving the movement of material, such as by contact of the second surface against projecting blunt fingers. Such localized distension preserves material mass while creating stress. Such localized distension can be provided by mechanical means, such as by a finger roller that can be rolled against the second surface of the substrate. The protruding fingers can be arranged on the roller at about 2–10 fingers/$cm^2$, with each fingertip affecting the dihedral angles of about 75 cube corner elements; such finger rollers are commercially available. The working of the second surface is accomplished by passing the second (flat) surface of the sheeting over the finger roller to create localized distension in the sheeting sufficient to create changes in the dihedral angles of the cube corner elements opposite the localized distensions. Copies can be made from the worked article, or the substrate can be the final sheeting article.

The degree of each working of the substrate at each location can be uniform or variable. The variation in the degree of working can be patterned or it can be semi-random. The locations of the workings also can be patterned or semi-random. "Semi-random" refers to a distribution that is under statistical control, but not controlled in full detail.

Figure 2:
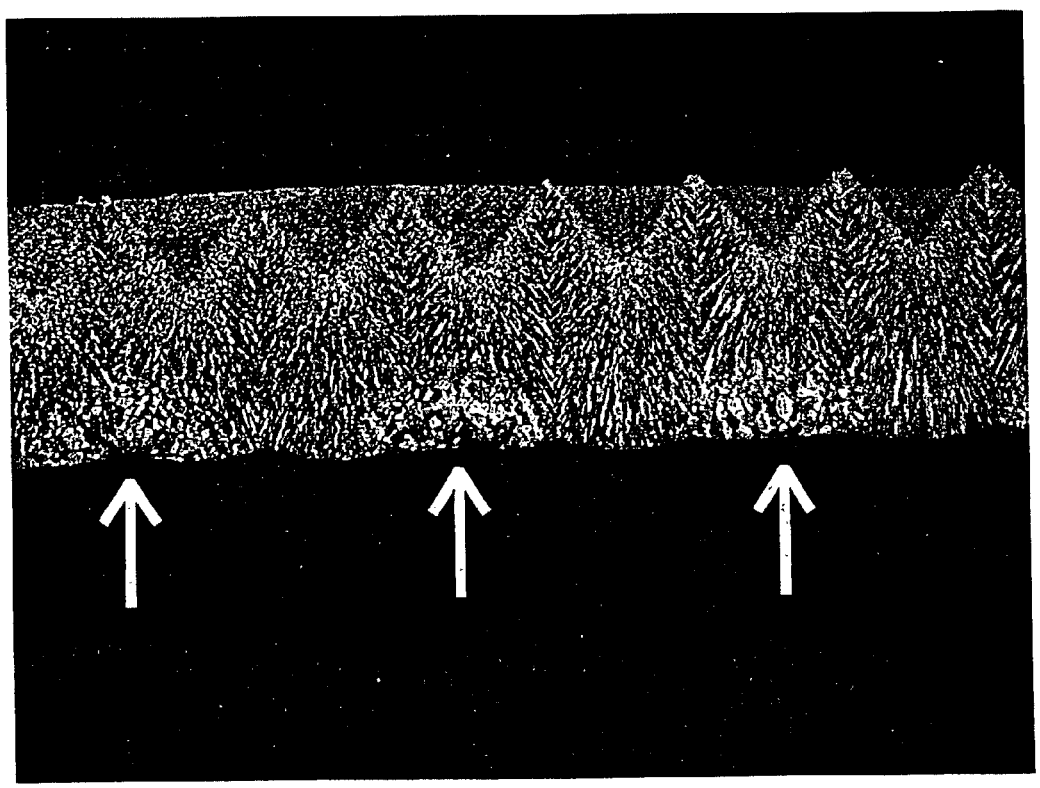
FIG. 2 is a photomicrograph of a cross-section of a metal substrate having a plurality of cube corner elements on one surface thereof, and subjected to laser energy at three discrete locations on the opposite surface.

One embodiment of the invention is illustrated in FIG. 2, which is a photomicrograph of a substrate of electroform nickel having a first surface and a second surface, with a pattern of female cube corner elements on the first surface thereof, the substrate having a thickness of 0.45 mm. Three predetermined localized regions on the second surface, indicated by arrows, spaced 0.5 mm apart, were each subjected to the application of a pulsed-focused laser having a wavelength of 1064 nm and pulse duration 4.0 ms supplying an energy of 1.35 J. The cross-sectional surface of the sample was polished and then acid etched to reveal grain structure in the photomicrograph. It can be seen from the revealed grain structure in FIG. 2 that the laser pulses produced small stresses in the substrate material. These small stresses exert an effect through the substrate 12 to cause an aberration of the cube corner element at the first surface. The effect on the dihedral angles is too small to be seen even with the photomicrograph, but will have an optically significant effect on the divergence of the cube corners, and thereby of the retroreflective products that are an n'th order copy of the substrate so worked.

One advantage of the instant invention is that, unlike methods that rely on the grooving to impart dihedral errors, for example the above-cited Appeldorn '219 and pending application Ser. No. 10/167,135, the instant method can place individual, strongly aberrated cube corners anywhere in the array surrounded by relatively unaberrated cube corners. Yet another advantage of the disclosed method is that, if the working is always focused on points on the second surface opposite the apices of cube corners, the result can be a population of strongly aberrated cube corners having nearly equal errors on their three dihedral angles, as is sometimes desirable. Yet another advantage of the disclosed method is that it can be used to adjust the divergence characteristics of a previously made cube corner master, or of an n'th order copy of a previously made master.

The worked substrate can be used to make retroreflective products according to methods known in the art. For example, after the localized working has been completed, several copies can be made of the first surface 13 of the substrate 12 and these copies can be assembled together either with or without copies of cube corner arrays including unaberrated cube corner elements, or cube corner arrays having other aberrations made from other worked substrates. Seamless copies of the assembly can be made such as by electrodeposition of nickel. A copy can be a tool. Tools made from such arrays of cube corner elements including one or more aberrated cube corner elements can be used to manufacture retroreflective products such as sheeting. Such manufacturing methods are known in the art and include, for example, embossing, casting, and compression molding. A tool of the instant invention can be used in each of these manufacturing methods and variations thereof. For example, a method of making a tool is disclosed in U.S. Pat. No. 4,478,769, and a method of embossing sheeting using such a tool is disclosed in U.S. Pat. No. 4,486,363, both incorporated herein by reference in their entireties.

The aberration can be applied at any one or more stages in the copying process, to a substrate having either male or female cube corners. An array that has been aberrated by the method of localized working can be further aberrated by re-application of the same method to the same substrate as bore the original array. An array that has been aberrated by the method of localized working can be copied one or more times and that copy can be further aberrated by the same method. Whatever the scheme, in the production of an article there is a last application of the method of localized working. Either the article is an n'th order copy of the substrate that received the last application of the method or else the article itself received said last application of the method.

EXAMPLE 1

Figure 3A:
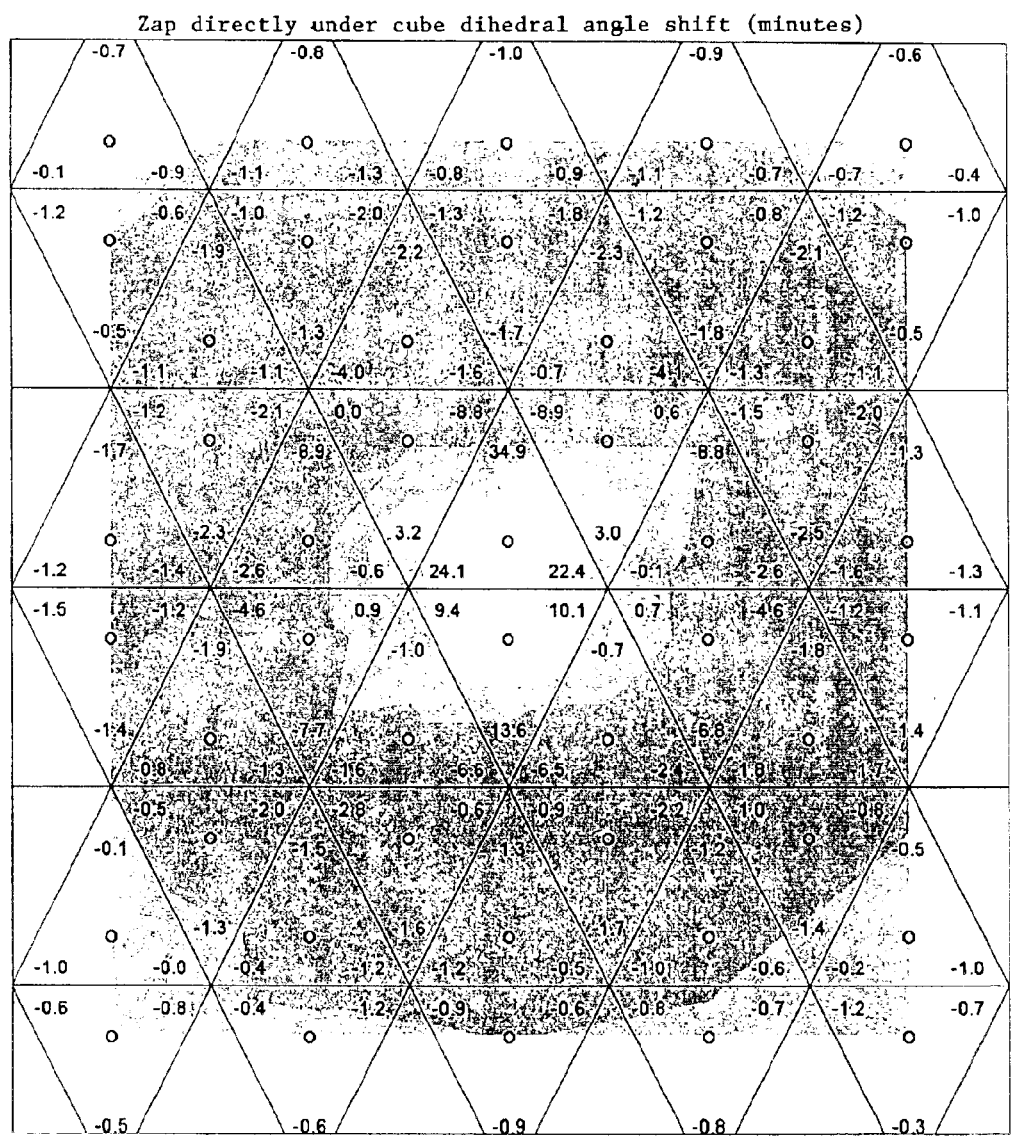
FIG. 3A is a schematic top plan view of an experimental array of triangular cube corner elements in which a stress has been introduced at the center cube corner element.

A nickel electroform 0.38 mm thick having an array of female triangular cube corner elements about 0.1 mm high on its first surface was worked in accordance with the instant invention using laser energy applied at the second surface directly opposite the apex of a cube corner element. The laser produced infrared radiation having a wavelength of 1064 nm, with a pulse duration of 4.0 ms, supplying 1.4 J of energy. The pulse on the second surface induced a stress in the electroform, resulting in a distortion of some of the dihedral angles on the first surface. In FIG. 3A, the triangular shape of each element is as shown. The small "o" symbol in the interior of each triangle locates the apex of the cube corner. The number in each corner of each triangular microcube indicates the measured deviation in minutes from 90° of the corresponding dihedral angle, wherein 1° equals 60 minutes. The cube corner element opposite the applied laser is just above the center of the Figure. That cube corner element nearest the focus of the laser had aberrations in its dihedral angles ranging from about one-third to about one-half of a degree. It may be seen from FIG. 3A that cube corner elements in the vicinity of the element opposite the pulse of laser energy also experienced aberrations of their dihedral angles, although those aberrations were not as great as those experienced by the center cube nearest the focus of the laser pulse. Generally, the dihedral angle aberrations are greater in those cube corner elements that are closer to the focus of the laser pulse, and are smaller in the cube corner elements that are farther from the focus of the laser pulse.

It is believed at the present time that a thinner substrate would require a lower energy laser pulse or other working means to produce an aberration in a cube corner element as shown in FIG. 3A, which would result in smaller aberrations in the neighboring cubes. Similarly, it is believed that a thicker substrate would require a higher energy laser pulse or other working means. Therefore, more of that energy would be dissipated to neighboring cubes resulting in greater changes of the dihedral angles of adjacent cube corner elements.

EXAMPLE 2

Figure 3B:
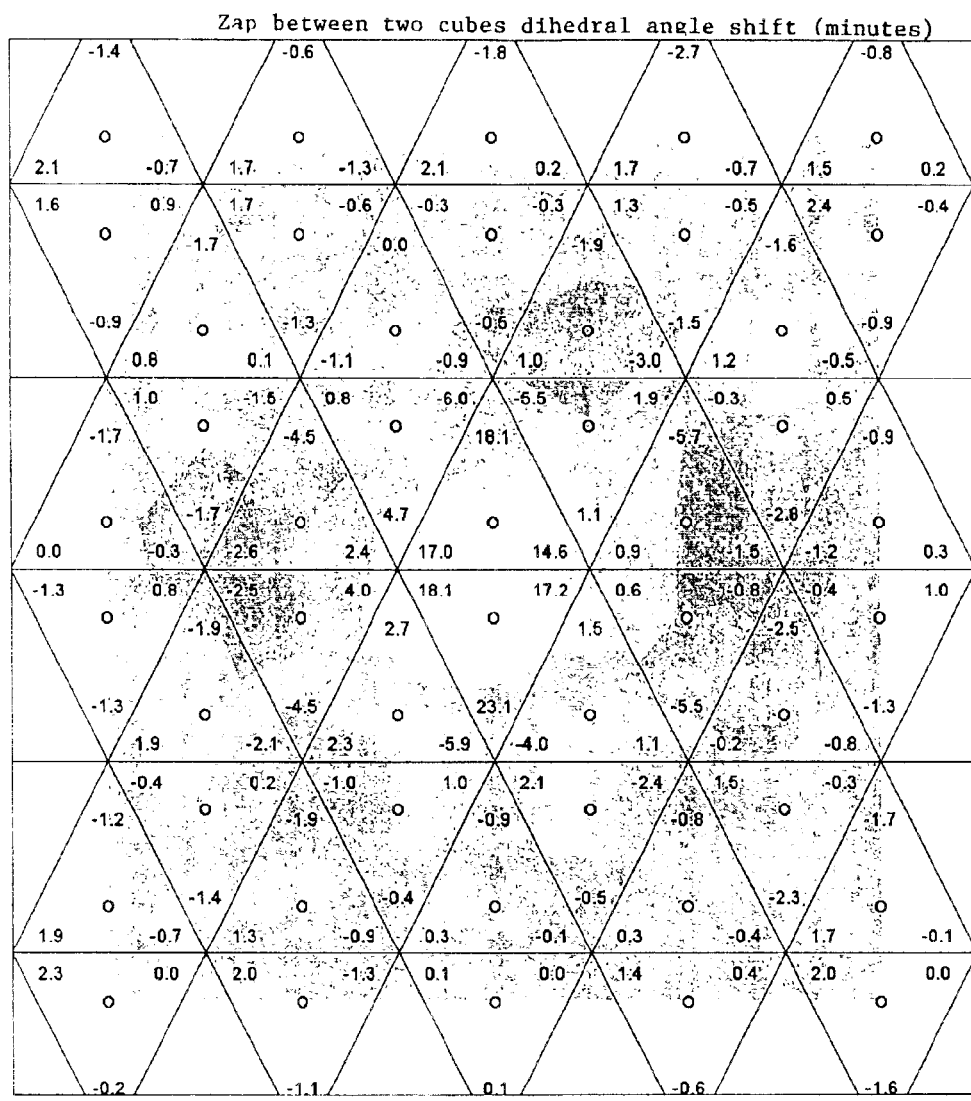
FIG. 3B is a schematic top plan view of an experimental array of triangular cube corner elements in which a stress has been introduced at an area between two cube corner elements.

At another location on the same nickel electroform used in Example 1 the second surface was worked in the same manner as in Example 1, except that the focus of the pulse of laser energy was directed to a portion of the second surface directly opposite the line between the two cube corners on the first surface. These two cube corners are shown nearest the center in FIG. 3B, which figure illustrates aberrations in the same manner as aberrations were illustrated in FIG. 3A. The two central cube corners had the greatest measured aberration of their dihedral angles, although the aberration was not as great as for the single cube in the center of FIG. 3A.

EXAMPLE 3

Figure 3C:
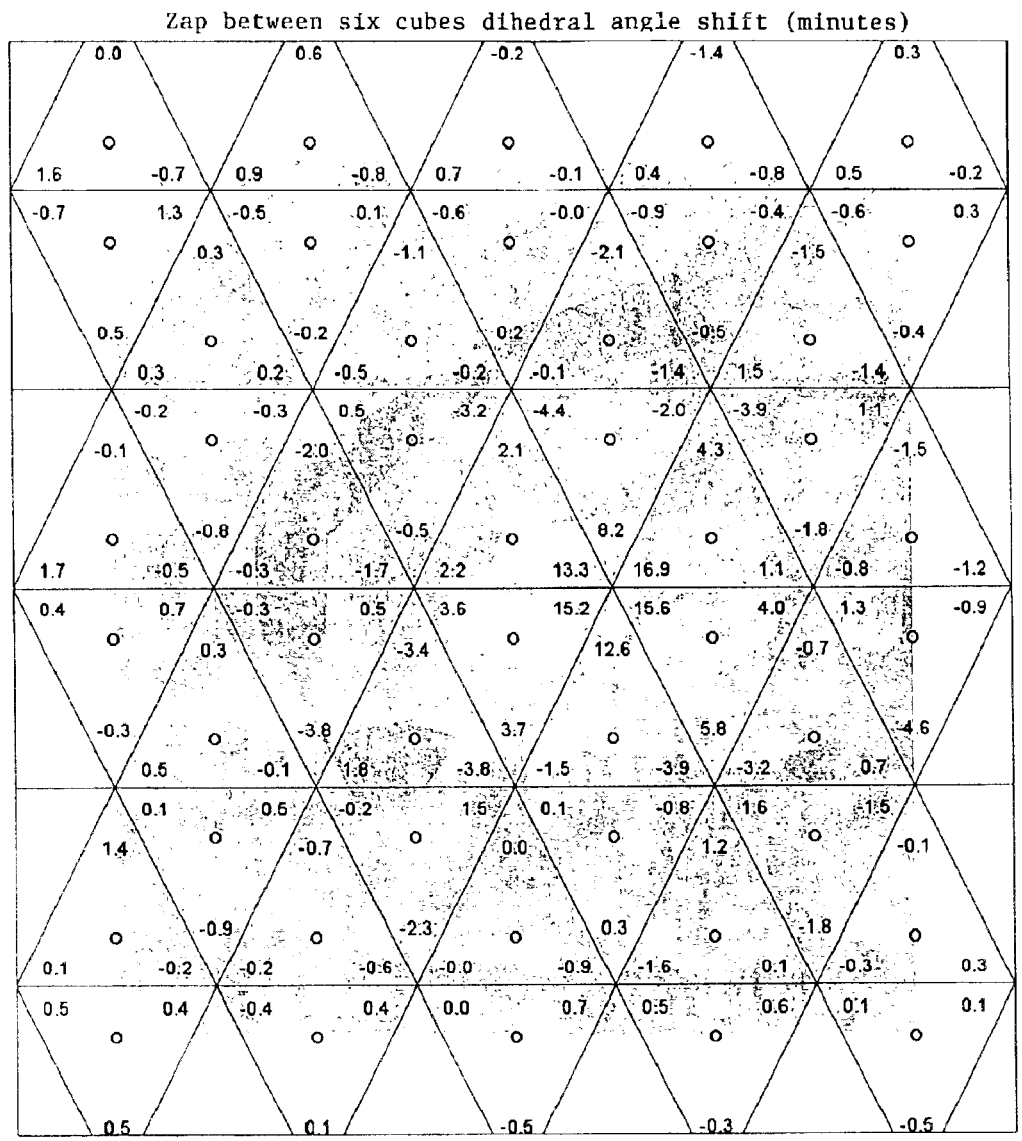
FIG. 3C is a schematic top plan view of an experimental array of triangular cube corner elements in which a stress has been introduced at an area between six cube corner elements.

At yet another location on the same nickel electroform used in Examples 1 and 2, the second surface was worked in the same manner as in Examples 1 and 2, except that the focus of the pulse of laser energy was directed to a portion of the second surface directly opposite the point on the first surface where six cube corners meet. This point is shown just to the right of the center of FIG. 3C, which figure illustrates aberrations in the same manner as aberrations were illustrated in FIG. 3A. Each dihedral angle emanating from that point showed significant measured aberration.

COMPARATIVE CALCULATIONS

Figure 4A:
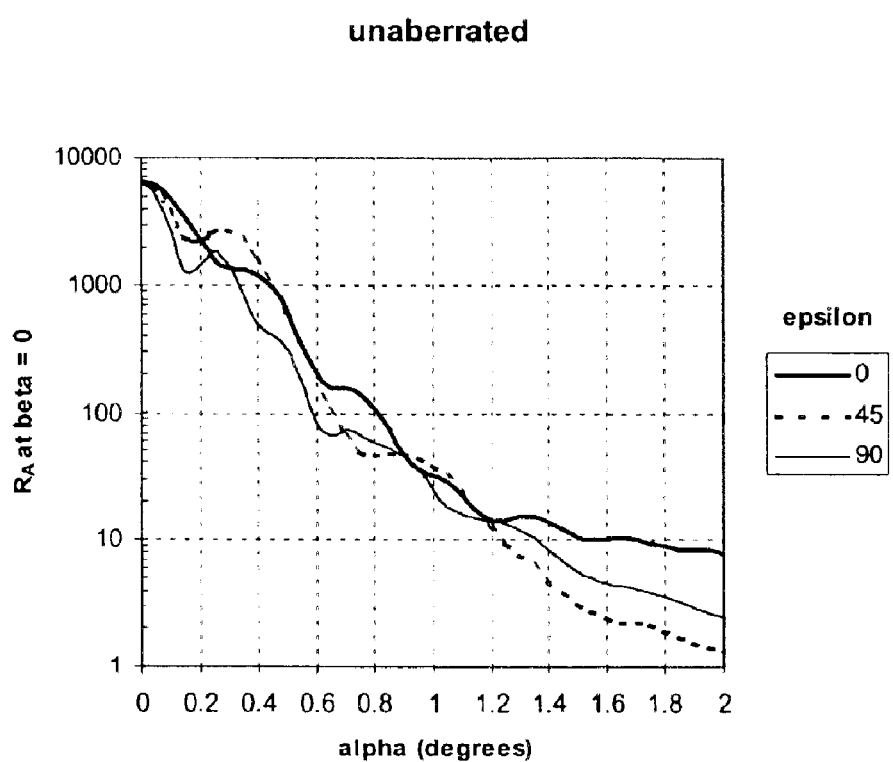
FIG. 4A is a graph showing calculated $R_A$ values of hypothetical prior art unaberrated cube corner sheeting over a divergence angle range of 2°, and for three different angles of rotation.
Figure 4B:
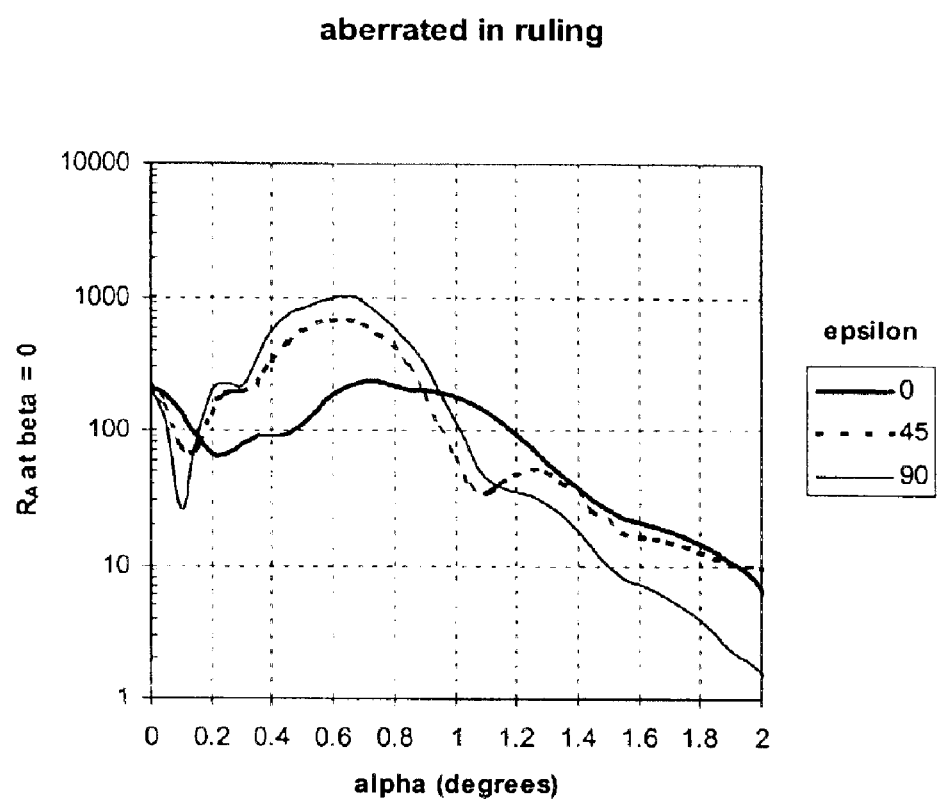
FIG. 4B is a graph showing $R_A$ values of hypothetical prior art cube corner sheeting made from a master aberrated during ruling in accordance with the prior art, the $R_A$ values being calculated over a divergence angle range of 2°, and for three different angles of rotation.
Figure 4C:
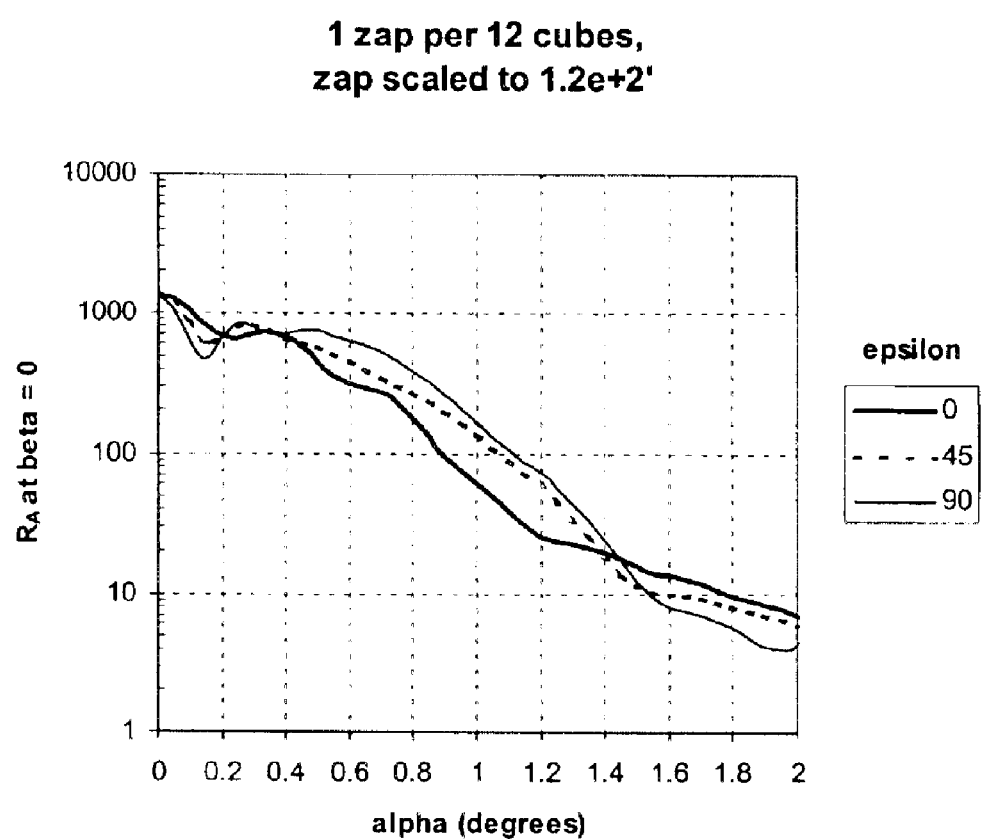
FIG. 4C is a graph showing calculated $R_A$ values of a hypothetical sample of a cube corner sheeting made in accordance with the instant invention in which astress has been introduced once for every 12 cube corner elements, the $R_A$ values being calculated over a divergence angle range of 2°, and for three different angles of rotation.

Predicted retroreflectance properties of two hypothetical prior art unmetallized acrylic cube corner sheetings are illustrated in FIGS. 4A–B, for comparison with predicted retroreflectance properties of hypothetical unmetallized acrylic cube corner sheeting made in accordance with the instant invention illustrated in FIG. 4C. FIG. 4A represents calculated retroreflectance of a hypothetical acrylic sheeting of the prior art, and being embossed from tooling having a pattern of triangular cube corner elements canted 7° edge-more-parallel, 0.1 mm deep, and which have no aberration. The mean geometrical divergence from the acrylic cubes is zero. The three curves of FIG. 4A represent calculated $R_A$ values for three different rotation angles 0°, 45° and 90° of the sheeting.

FIG. 4B represents calculated retroreflectance of a hypothetical acrylic sheeting of the prior art embossed from tooling which differs from the tooling used to make the sheeting of the example of FIG. 4A by having aberrations introduced during the ruling of the master. These aberrations are in the form of dihedral angle errors equal to +9.5 minutes on the two shorter dihedral edges and +7.0 minutes on the longer dihedral edge of each triangular cube corner. These unequal dihedral angles were chosen to produce the most nearly symmetrical balance of geometrical divergence for the canted triangular cube corner sheeting of FIG. 4A. When made in acrylic, the mean geometric divergence of cube corners with these ruled aberrations in their dihedral angles equals 41.5 arc minutes. The three curves of FIG. 4B represent $R_A$ values for three different rotation angles 0°, 45° and 90° of the sheeting.

FIG. 4C represents a calculated retroreflectance of a hypothetical acrylic sheeting embossed from a tooling of the present invention. The tooling differs from the tooling of the example of FIG. 4A by having a pattern of aberrations introduced by laser working on the second surface in the manner of EXAMPLE 1 and as shown in FIG. 3A, except that (1) instead working the second surface at a single point opposite a single cube, working is opposite one out of every twelve cube corner elements, (2) aberrations are multiplied by 1.2, to predict the effect of the application of a slightly stronger laser pulse, and (3) it is assumed that the cube corner elements each have a positive error of +2 arc minutes in each dihedral angle before the application of the laser energy. The mean dihedral angle error of this inventive tooling is then −0.3 arc minutes, and the standard deviation of dihedral angle error is 11.7 arc minutes. The mean geometric divergence of acrylic cube corner sheeting made from such tooling is 41.5 arc minutes, identical to the example of FIG. 4B. Specifically, FIG. 4C shows three curves corresponding to calculated $R_A$ values of the hypothetical cube corner array described immediately above measured for three different rotation angles, namely, 0°, 45° and 90°.

Figure 4D:
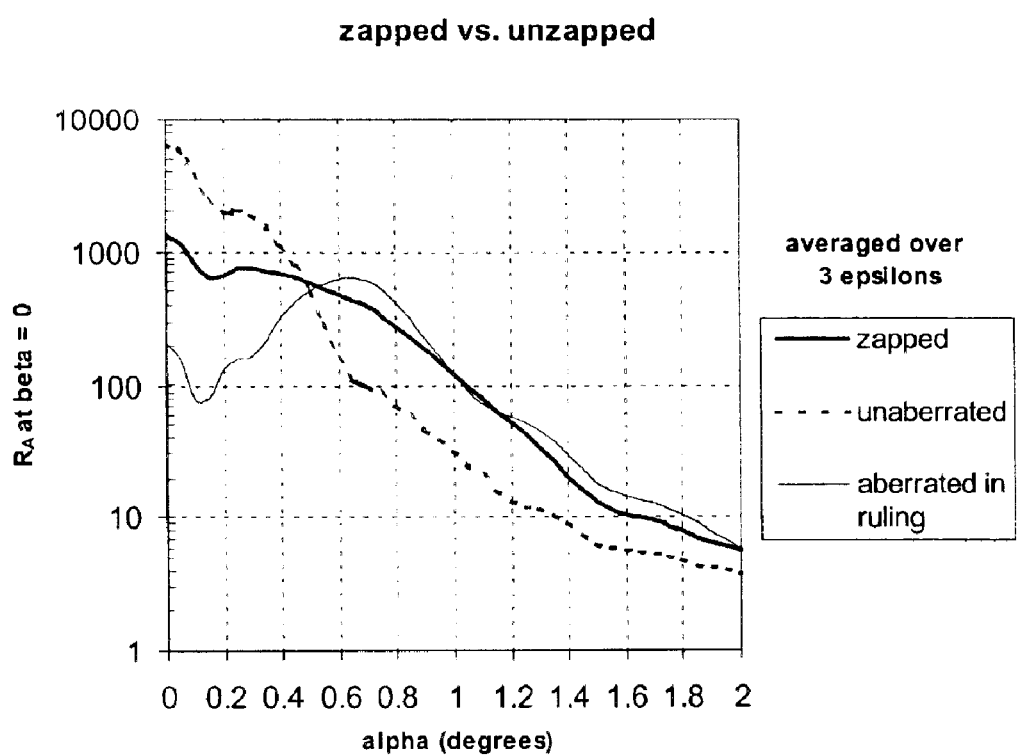
FIG. 4D is a graph comparing the average of the three curves of FIG. 4A, the average of the three curves of FIG. 4B, and the average of the three curves of FIG. 4C.

FIG. 4D compares the average of the three curves of FIG. 4A, the average of the three curves of FIG. 4B, and the average of the three curves of FIG. 4C. It may be seen that while the prior art sheeting of FIG. 4A gives a much higher intensity over a very narrow range of divergence angle, the retroreflectance values for the cube corner array in which aberrations have been introduced by the method of the instant invention as described and illustrated in connection with the embodiment of FIG. 4C is predicted to have its intensity extended over a larger useful range of divergence angles, up to about 2°. It also may be seen that while the prior art sheeting aberrated in ruling as illustrated in FIG. 4B gives intensity similar to the inventive example over the divergence angle range from about 0.5° to 2.0°, the example of 4B has deficient intensity at the smaller divergence angles rendering it less desirable for typical applications such as road signs.

In a preferred embodiment of the invention, the working done on the second surface will not unduly distort the cube corner elements or unduly impact the smoothness of the optical first surface, such that the total retroreflectance of the array is substantially preserved. While the desired percentage of preserved retroreflectance will vary depending on the total retroreflectance of the original array and the ultimate end use of the retroreflective article, the total retroreflectance preserved is desirably at least 90%, preferably 94% or better, and most preferably 98% or better. When we first used a focused laser on the second surface of thin nickel electroforms, some degradation of the smoothness of the optical first surface seems to have occurred. In one case, the total retroreflectance from the female electroform was reduced by approximately 6%. This would imply a similar loss from articles produced from the tooling. As of the date of this application, it is believed that such losses are practically eliminated by working in a non-oxidizing environment, or by sputtering the electroform first with a non-oxidizing coating, such as of gold. At the present time, it is believed that the losses observed were due to a surface degradation phenomenon from without, and not due to internal phenomena or to an excess curvature introduced in the cube faces or edges.

At the present time, when using a focused laser on the second surface of thin electroforms, the electroforms are left attached to the rigid mandrels on which they were formed. This both excludes air and provides for rigid support. Total retroreflectance from such electroforms has been found to be reduced by no more than approximately 2% by the laser treatment. Additionally, it may be useful to machine the second surface of the supported thin electroform to a precise uniform substrate thickness before the laser treatment, since the effect on the dihedral angles of a given pulse energy is a function of substrate thickness.

Note that when comparing the total retroreflectance of electroforms before and after laser treatment, discoloration of the optical surface may influence the measurements. We measured plastic copies formed from the electroform before and after treatment for their total retroreflectance and used this to gauge the change to the electroform.

When the inventive technique is practiced using the mechanical removal of material, such as by micro-drilling or micro-machining, it is preferable that the substrate have internal stress initially. The material removal then achieves localized stress relief of the initially uniformly stressed substrate. Subtraction of local stress and addition of local stress are interchangeable for the purpose of the inventive technique. For an electroformed substrate, the initial uniform stressing can be accomplished during its formation, by well-known methods of plating stress-control. The invention may take on various modifications and alterations without departing from the spirit and scope thereof. The invention will be most useful for structures made by global operations such as ruling. For example, although the invention has been illustrated herein using patterns of triangular cube corner elements, cube corner elements that are square, rectangular, pentagonal, or hexagonal can also be used. The invention can also be used with micro-optical systems other than cube corners. Accordingly, it is to be understood that the scope of this invention is not to be limited to the above-described examples, but is to be controlled by the limitations set forth in the following claims and any equivalents thereof.

We claim:

1. A method of producing an array of aberrated micro-optical elements, the method comprising
   providing a substrate having opposed first and second surfaces, said first surface having an array of micro-optical elements formed thereon, and
   controlled working at one or more localized regions on the second surface of the substrate, the controlled working being of a magnitude sufficient to aberrate one or more of the micro-optical elements opposite the site of the working.

2. The method of claim 1 wherein said substrate is an electroform formed on a mandrel, and said controlled working on the second surface is performed while said electroform is still attached to said mandrel.

3. The method of claim 1, wherein the controlled working does not disturb the array, except for aberrational changes within individual of the micro-optical elements of the array.

4. The method of claim 1, wherein the magnitude of the working is sufficiently small such that smoothness of faces of the micro-optical elements is not substantially damaged.

5. The method of claim 1, wherein the magnitude of the working is sufficiently small such that sharpness of edges of the micro-optical elements is not substantially damaged.

6. The method of claim 1, wherein the working includes working such that total retroreflectance of each of the micro-optical elements is substantially preserved.

7. A method of producing an array of cube corners having controlled divergence, the method comprising
   providing a substrate having opposed first and second surfaces, said first surface having an array of cube corner elements formed thereon, and
   controlled working at one or more localized regions on the second surface of the substrate, the controlled working being of a magnitude sufficient to change one or more dihedral angles of one or more of the cube corner elements opposite the site of the working, whereby said one or more cube corner elements will be aberrated to create an array of cube corner elements having divergence over a desired range.

8. The method of claim 7 wherein said substrate has a thickness in the range of about 0.1 to about 2.0 mm.

9. The method of claim 7 wherein said substrate is made from a metal.

10. The method of claim 9 wherein said metal is electroformed nickel.

11. The method of claim 7 wherein said substrate is made from a plastic.

12. The method of claim 7 wherein said controlled working is accomplished by the application of pressure.

13. The method of claim 12 wherein said pressure step induces localized distension to a substrate.

14. The method of claim 7 wherein said controlled working is accomplished by the application of energy.

15. The method of claim 14 wherein the application of energy is selected from the application of laser energy and the application of focused heat energy.

16. The method of claim 7 wherein said controlled working is accomplished by the application of chemicals.

17. The method of claim 16 wherein the application of chemicals comprises the application of a solvent to a plastic substrate.

18. The method of claim 7 wherein said controlled working is accomplished by machining.

19. The method of claim 18 wherein said machining step comprises drilling.

20. The method of claim 7 wherein the total retroreflectance of the worked array of cube corners is at least 90% that of the array before working.

21. The method of claim 20 wherein the total retroreflectance of the worked array of cube corners is at least 94% that of the array before working.

22. The method of claim 20 wherein the total retroreflectance of the worked array of cube corners is at least 98% that of the array before working.

23. The method of claim 7 wherein said substrate is sheeting and said working is accomplished by the application of pressure at discrete locations at the second surface of the sheeting, the pressure being sufficient to introduce aberrations in one or more of the cube corner elements on the front surface of the sheeting.

24. A method of making an article comprising an array of cube corners and having controlled divergence, the method comprising
   providing a substrate having opposed first and second surfaces, said first surface having an array of cube corner elements formed thereon,
   controlled working at one or more localized regions on the second surface of the substrate, the controlled working being sufficient to change one or more dihedral angles of one or more of the cube corner elements opposite the site of the working, and
   creating an n'th order copy of the array.

25. The method of claim 24 wherein the total retroreflectance of said provided array is substantially preserved by said controlled working.

26. An article made by the method of claim 24.

27. The article of claim 26 wherein said article is retroreflective.

* * * * *